United States Patent
Čaněk et al.

(10) Patent No.: US 9,959,272 B1
(45) Date of Patent: May 1, 2018

(54) AUTOMATIC CLASSIFICATION AND TRANSLATION OF WRITTEN SEGMENTS

(71) Applicant: Memsource a.s.

(72) Inventors: David Čaněk, Prague (CZ); Dalibor Frívaldský, Banská Štiavnica (SK); Aleš Tamchyna, Most (CZ)

(73) Assignee: Memsource a.s., Prague (CZ)

( * ) Notice: Subject to any disclaimer, the term of this patent is extended or adjusted under 35 U.S.C. 154(b) by 0 days. days.

(21) Appl. No.: 15/657,065

(22) Filed: Jul. 21, 2017

(51) Int. Cl.
G06F 17/28 (2006.01)
G06N 3/04 (2006.01)
G06N 99/00 (2010.01)

(52) U.S. Cl.
CPC ........ *G06F 17/289* (2013.01); *G06F 17/2818* (2013.01); *G06N 3/0445* (2013.01); *G06N 99/005* (2013.01); *G06F 17/2827* (2013.01); *G06F 17/2836* (2013.01); *G06F 17/2845* (2013.01); *G06F 17/2854* (2013.01)

(58) Field of Classification Search
None
See application file for complete search history.

(56) References Cited

U.S. PATENT DOCUMENTS

| | | | | |
|---|---|---|---|---|
| 7,020,601 B1 * | 3/2006 | Hummel | ........... | G06F 17/278 704/1 |
| 7,680,647 B2 * | 3/2010 | Moore | ........... | G06F 17/2827 704/2 |
| 2008/0154577 A1 * | 6/2008 | Kim | ........... | G06F 17/2775 704/2 |
| 2008/0162118 A1 * | 7/2008 | Itoh | ........... | G06F 17/2735 704/10 |
| 2014/0006003 A1 * | 1/2014 | Soricut | ........... | G06F 17/2854 704/2 |
| 2014/0114642 A1 * | 4/2014 | van den Oever | ... | G06F 17/2818 704/2 |
| 2014/0207439 A1 * | 7/2014 | Venkatapathy | ........ | G06F 17/2836 704/4 |
| 2015/0278201 A1 * | 10/2015 | Prokofyev | ........ | G06F 17/2872 704/2 |

(Continued)

OTHER PUBLICATIONS

Bahdanau, D., Cho, K. & Bengio, Y. Neural machine translation by jointly learning to align and translate. In Proc. International Conference on Learning Representations http://arxiv.org/abs/1409.0473 (2015).*

(Continued)

*Primary Examiner* — Richard Zhu
(74) *Attorney, Agent, or Firm* — Hickman Palermo Becker Bingham LLP

(57) ABSTRACT

A translation server computer and related methods are described. The translation server computer is programmed or configured to create computer-implemented techniques for classifying segments in a source language as non-translatable into a target language, nearly-translatable into the target language, or otherwise, and for generating translations in the target language for the segments classified as nearly-translatable. The translation server computer is further programmed or configured to apply the computer-implemented techniques on an input document to generate a classification and a translation when appropriate for each segment in the document, and cause a user computer to display the translations and classifications.

12 Claims, 8 Drawing Sheets

(56) References Cited

U.S. PATENT DOCUMENTS

2016/0196820 A1* 7/2016 Williams .............. G10L 15/005
 704/244
2017/0169015 A1* 6/2017 Huang ................ G06F 17/2854

OTHER PUBLICATIONS

N. Kalchbrenner, L. Espeholt, K. Simonyan, A. v. d.Oord, A. Graves, and K. Kavukcuoglu. Neural machine translation in linear time. arXiv:1610.10099, 2016.*

Yonatan Belinkov and James Glass. A Character-level Convolutional Neural Network for Distinguishing Similar Languages and Dialects. In Proceedings of the VarDial Workshop, 2016.*

Sun et al., "Convolutional neural networks for correcting English article errors", NLPCC 2015, pp. 102-110.*

Zhang et al., "Character-level Convolutional Networks for Text Classification", dated 2015, 9 pages.

Iran et al., "Neural-based Natural Language Generation in Dialogue using RNN Encoder-Decoder with Semantic Aggregation", dated Jun. 25, 2017, 10 pages.

Popovic, Maja, "CHRF: character n-gram F-score for automatic MT evaluation", Proceedings of the Tenth Workshop on Statistical Machine Translation, dated Sep. 2015, 4 pages.

Lee et al., "Fully Character-Level Neural Machine Translation without Explicit Segmentation", dated Jun. 13, 2017, 13 pages.

Le et al. "Do Convolutional Networks Need to Be Deep for Text Classification." arXiv:1707.04108 dated 2017, 11 pages.

Lamb et al., "Convolutional Encoders for Neural Machine Translation". Stanford University, Department of Science 8 pages.

Klima, Grzegorz, "A new approach towards implementing artificial neural networks" dated Dec. 15, 2013, 15 pages.

Kingma et al., Adam: A Method for Stochastic Optimization, ICLR, dated 2015, 15 pages.

Kim, Yoon, "Convolutional Neural Networks for Sentence Classification", Proceedings of the 2014 Conference on Empirical Methods in Natural Language Processing, Oct. 2014, 6 pages.

Kim et al., "Character-Aware Neural Language Models", Proceedings of the Thirtieth AAAI Conference on Artificial Intelligence, dated Dec. 2015, 9 pages.

Kilma, Grzegorz, "Package FCNN4R", Fast Compressed Neural Networks for R, Verision 0.6.2 , dated Mar. 9, 2016, 29 pages.

Costa-Jussa et al., "Character-based Neural Machine Translation", dated Jun. 30, 2016, 5 pages.

C'Icero Nogueira Dos Santos et al., "Learning Character-level Representations for Part-of-Speech Tagging", Proceedings of the 31 st International Conference on Machine Learning, dated 2014, 9 pages.

Bluche et al, "Where to Apply Dropout in Recurrent Neural Networks for Handwriting Recognition?", dated 2015, 5 pages.

Bahdanau et al., "Neural Machine Translation by Jointly Learning to Align and Translate", ICLR dated 2014, 15 pages.

* cited by examiner

FIG. 3

Non-Translatable Segments 302

| English | German (Same as English) |
|---|---|
| Labs.Core.IComponentInstance | |
| MESO SCALE DIAGNOSTICS, LLC. | |
| Version | |
| SharePointFoundation 2013 | |
| 17 | |
| System.Int32 | |
| Office Web Online | |
| friend.php | |
| 1.1 | |
| Name | |

Nearly-Translatable Segments 304

| English | German |
|---|---|
| 14/12/2014 | 14.12.2014 |
| 585/1000; Length: | 585/1000 - Länge: |
| ‹#› | ‹Nr.› |
| 585/1000 - 26.1 mm - 1.7 g | 585/1000 - 26,1 mm - 1,7 g |
| Shift+Right Arrow | UMSCHALT+NACH-RECHTS-TASTE |
| {1}none{2} | {1}kein{2 |
| 3/31/1998 | 31.03.1998 |
| September 6, 2016: | 6. September 2016: |
| 10.00 mm | 10,00 mm |
| 5 bytes | 5 Bytes |

FIG. 6

Czech-English Translation Process

| Segment 602 | Classification Score 604 | Classification 606 | Translation 608 |
|---|---|---|---|
| telecí pečínka, tuňáková salsa, kapary. | 0.035 | Generally-Translatable | |
| Moravské vinařské stezky. | 0.107 | Generally-Translatable | |
| 53 107 | 0.596 | Nearly-Translatable | 53,107 |
| Pacient 2 | 0.865 | Nearly-Translatable | Patient 2 |
| 10/2014 – 2/2016 | 0.952 | Non-Translatable | 10/2014 – 2/2016 |
| ISO 14001:2004. | 0.991 | Non-Translatable | ISO 14001:2004. |

AUTOMATIC CLASSIFICATION AND TRANSLATION OF WRITTEN SEGMENTS

TECHNICAL FIELD

The present disclosure generally relates to providing automatic translations between human-understandable languages and, more specifically, automatic classification and translation of written segments, including text segments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

To accurately translate a document from one human-understandable language, such as English, French, or Chinese, to another, one conventional approach is to split the document into segments, such as sentences, and assign the segments to one or more human translators. The utilization of manual labor can be time-consuming and expensive. Therefore, a method that helps reduce such utilization of manual labor could be helpful.

BRIEF DESCRIPTION OF THE DRAWINGS

FIG. 3 illustrates examples segments in a source language that have been classified by human-translators as non-translatable or nearly-translatable into a target language.

FIG. 6 illustrates an example graphical user interface for interacting with a user in a translation process.

DETAILED DESCRIPTION

Figure 1:
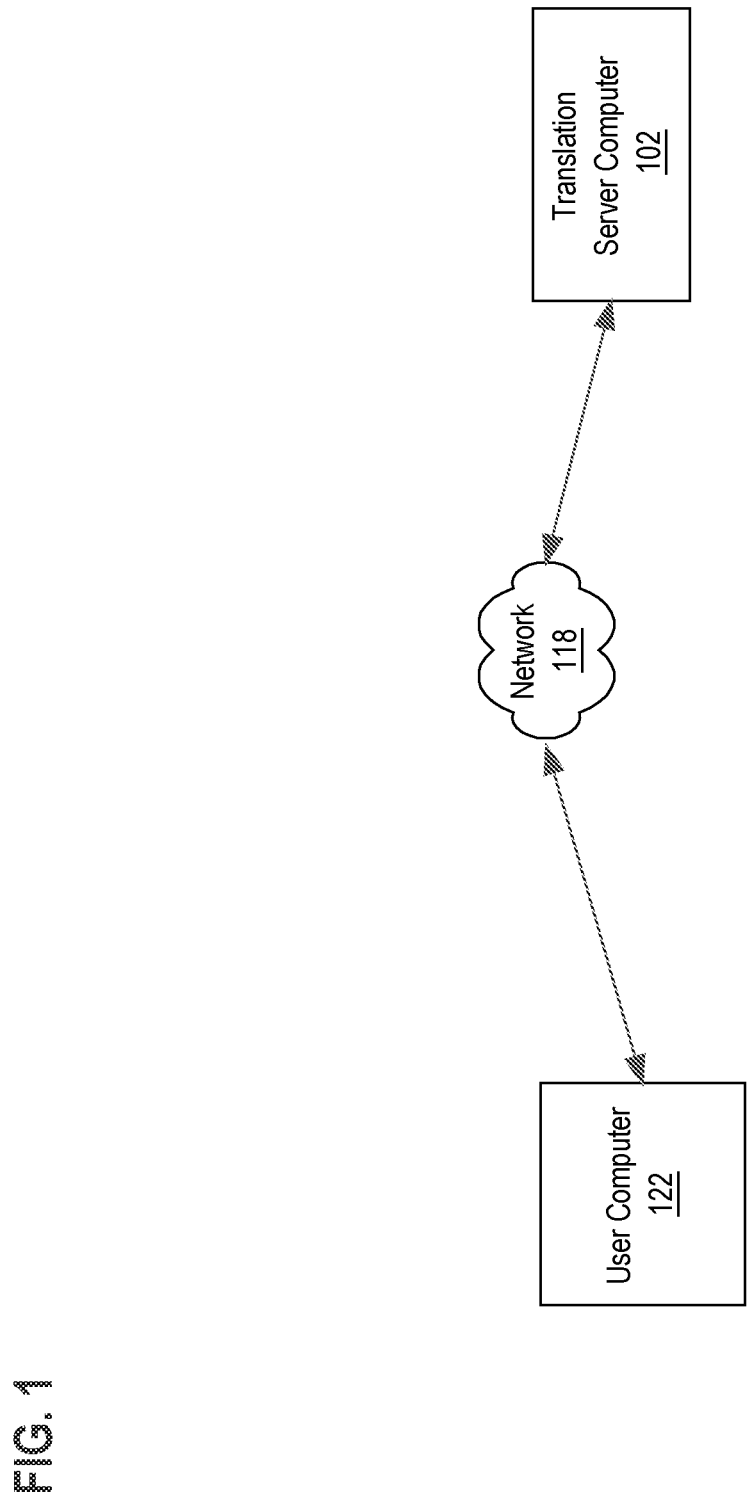
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

GENERAL OVERVIEW
EXAMPLE COMPUTING ENVIRONMENT
EXAMPLE SYSTEMS AND METHODS
  IDENTIFICATION OF NON-TRANSLATABLE SEGMENTS AND NEARLY-TRANSLATABLE SEGMENTS
  TRANSLATION OF NEARLY-TRANSLATABLE SEGMENTS
  PRESENTATION OF AUTOMATIC TRANSLATIONS
  EXAMPLE PROCESSES
IMPLEMENTATION EXAMPLE—HARDWARE OVERVIEW
OTHER ASPECTS OF DISCLOSURE

General Overview

This disclosure relates to a translation server computer ("server") and related methods that create and store computer-implemented techniques or instructions for identifying segments in a source language that are non-translatable or nearly-translatable into a target language and providing automatic translations for the nearly-translatable segments. Given a document comprising segments in a source language, some of the segments may not change forms in a target language. Such segments are referred to as "non-translatable segments" in a translation from the source language to the target language. Some of the segments may change forms but only slightly in the target language. For example, a date or an address typically needs to undergo only a typographical change. Such segmented are referred to as "nearly-translatable segments" in a translation from the source language to the target language.

In some embodiments, the server can create and store a first statistical model comprising rules or instructions to classify segments as non-translatable or translatable from a source language to a target language. Each segment can comprise letters, numbers, or other symbols, depending on the alphabet of the source language. The first statistical model can be generated from a first training set of segments that have been classified as non-translatable or translatable, which can be further divided into nearly-translatable and generally-translatable in the source language. The server can then create a technique that identifies nearly translatable segments from the translatable segments. Furthermore, the server can create and store a second statistical model to generate translations from the source language to the target language for nearly-translatable segments. Each translation can similarly comprise letters, numbers, or other symbols, depending on the alphabet of the target language. The second statistical model can be generated from a second training set of text segments that have been classified as nearly-translatable in the source language and text segments that have been deemed as translations of these nearly-translatable segments in the target language.

In some embodiments, subsequently, in response to receiving a document comprising segments from a user computer, the server can determine whether each segment in the document is non-translatable, nearly-translatable, or neither using the first statistical model and the technique. In response to a segment classified as nearly-translatable, the server can generate a translation for the segment using the second statistical model. For a segment that is classified as non-translatable, the server can transmit the segment as the translation to the user computer. For a segment that is classified as nearly-translatable segment, the server can transmit the generated translation. For every other segment, the server can instruct the user computer to request a human translation.

The server and related methods produce many technical benefits, as discussed throughout this application. First, the server and methods can model the classification of a segment as non-translatable or nearly-translatable and generate automatic translations for those segments classified as nearly-translatable at the finer character level instead of the coarser word level. Because the segments to be represented by these character-level models are typically short, computation of such character-level models does not incur significant overhead compared to the computation of word-level models. Therefore, the server and methods achieve high computational accuracy without requiring significantly more computational resources. Second, the server and methods can model the classification of a segment as non-translatable or nearly-translatable and generate automatic translations for those segments classified as nearly-translatable using statistical, rigorous methods, such as convolutional or recurrent neural networks. Therefore, the systems and methods further achieve high computational accuracy. Third, the server and methods can set a relatively stringent threshold for identifying non-translatable segments and a relatively loose threshold for identifying nearly-translatable segments to achieve a high precision in identifying segments that do not require translation while offering a large coverage in providing automatic translations for given segments. These automatic translations tend to be minor or relatively straightforward and thus have high quality. Therefore, the server and methods achieve high computational accuracy and reduce substantial manual labor and associated costs.

In some embodiments, a computer-implemented method of automatically classifying written segments and translating written segments between human-understandable languages is disclosed. The method comprises receiving, by a processor of a first computer, a first training set of segments, including a first plurality of segments in a source language that have been classified as non-translatable to a target language and a second plurality of segments in the source language that have been classified as nearly-translatable to the target language. The method also comprises creating and storing in memory, by the processor, a first statistical model from the first training set for classifying segments based on a translatability from the source language to the target language, where the first statistical model accepts an input segment and produces a score for the input segment that indicates a translatability of the segment. The method further comprises determining a set of criteria that converts the score into a classification as non-translatable to a target language, nearly-translatable to a target language, or neither. In addition, the method comprises receiving a document comprising a set of segments in the source language from a second computer over a communication network. The method further comprises determining a classification for each of the set of segments using the first statistical model and the set of criteria. Finally, the method comprises transmitting the set of classifications to the second computer.

Example Computing Environment

FIG. 1 illustrates an example networked computer system in which various embodiments may be practiced. FIG. 1 is shown in simplified, schematic format for purposes of illustrating a clear example and other embodiments may include additional or different elements.

In some embodiments, a computer network system 100 comprises a translation server computer ("server") 102 and one or more user computers 122, which are communicatively coupled directly or indirectly via one or more networks 118. The different components of the computer network system 100 can reside in the same or different computer network domains.

The server 102 broadly represents one or more computers, virtual computing instances, and/or instances of a server-based application that is programmed to host or execute functions of a translation server computer including but not limited to creating and applying models or techniques for classifying segments in a source language and providing translations in a target language for segments having certain classifications. The server 102 can comprise a server farm, a cloud computing platform, a parallel computer, or any other computing facility with sufficient computing power in data processing, data storage, and network communication for the above-described functions.

A user computer 122 may comprise a desktop computer, laptop computer, tablet computer, smartphone, wearable device, or any other type of computing device that is capable of proper communication with the server 102 as well as adequate local data processing and storage.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 can receive training data from the user computer 122 or other sources. Based on the training data, the server 102 can create and save models or techniques comprising rules or instructions for classifying segments in a source language as non-translatable, nearly-translatable, or translatable into a target language. Further based on the training data, the server 102 can create and save models or techniques for generating translations for nearly-translatable segments into the target language.

In some embodiments, subsequently, the server 102 can receive a document comprising segments in the source language from the user computer 122 for translation into the target language. The server 102 can execute the saved models or techniques on the segments to generate classifications for the segments and translations into the target language for those segments classified as nearly-translatable. The server 102 then can send the generated classifications and translations to the user computer 122. For those segments with a non-translatable classification, the user computer 122 can be instructed to display those same segments as the translations; for those segments with a nearly-translatable classification, the user computer 122 can be instructed to display the generated translations as the translations. For all the other segments in the document, the user computer 122 can be instructed to receive translations from users and send the received translations to the server computer 102 for future training and update of the models and techniques.

Example Systems and Methods

Figure 2:
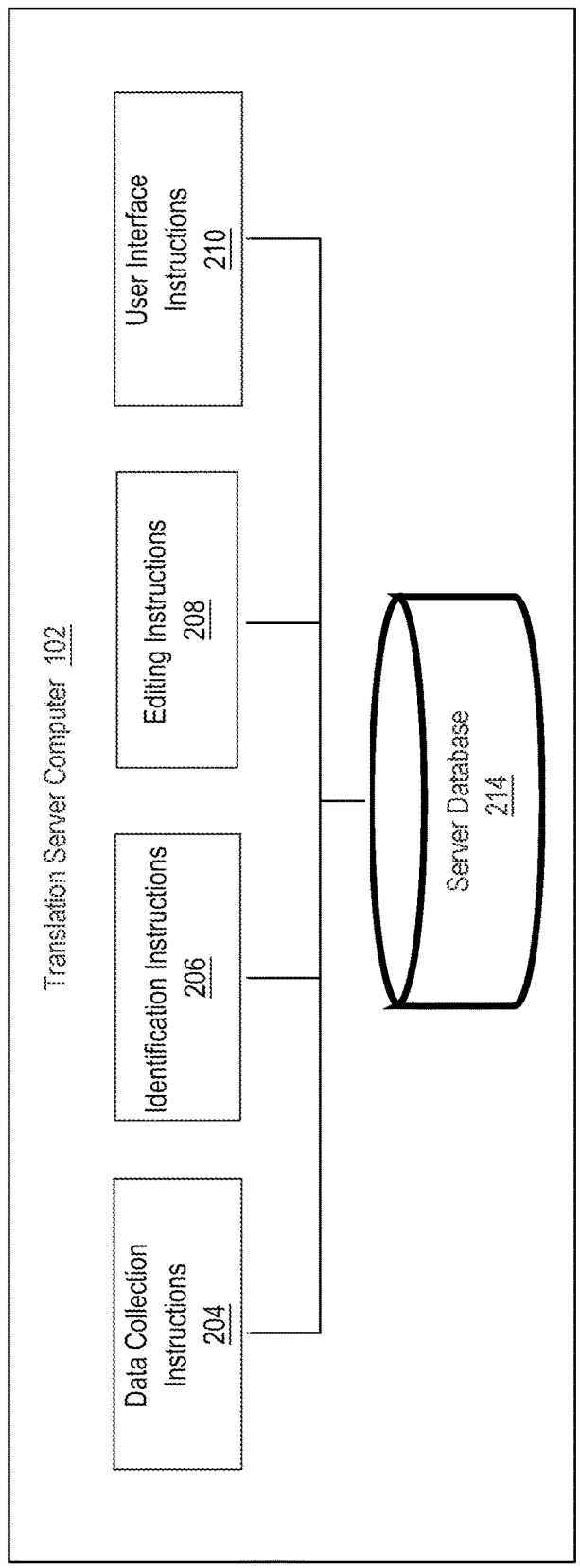
FIG. 2 illustrates example components of a server.

FIG. 2 illustrates example components of a server. In some embodiments, the server 102 can comprise a data collection component 204, an identification component 206, an editing component 208, and a user interface component 210. The server 102 also can comprise one or more server databases 214. It will be appreciated that these diagrams are for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

The data collection component 204 of the server 102 is programmed or configured for collecting training datasets for creating models or techniques for classifying segments in a source language as non-translatable or translatable into the target language or for translating nearly-translatable segments from the source language to the target language. The training datasets can also be used to determine techniques or methods for classifying translatable segments as nearly-translatable or generally-translatable. The training datasets can contain data previously classified by humans or other systems. The identification component 206 is programmed or configured for creating models or techniques for classifying segments in the source language as non-translatable or translatable into the target language or for classifying translatable segments as nearly-translatable or generally-translatable, based on the training datasets. These techniques can be used to automatically identify a segment as non-translatable or nearly-translatable. The editing component 208 is programmed or configured for creating, for segments in the source language that are nearly-translatable into the target language, translations in the target language. This component does not have to provide translations for non-translatable segments because the translations would be identical to those segments. The user interface component 210 is programmed or configured for receiving a document in the source language for translation into the target language and transmitting the classifications for the segments in the document and translations for those segments classified as non-translatable or nearly-translatable for presentation to a user. The user interface component 210 can also be programmed to transmit requests for translations for the segments that have been classified as generally-translatable, receive the requested translations, and save those translations for subsequent update of the training datasets and the models, heuristics, or techniques. The server database 214 stores training datasets, data related to users, languages, human translators, or other relevant data.

Identification of Non-Translatable Segments and Nearly-Translatable Segments

Preparing Training Data

In some embodiments, the server 102 is programmed or configured with data structures and/or database records that are arranged to receive training datasets from a user computer 122 or other sources. The training data can include a number of segments in a source language and translations of the segments into a target language. The translations are preferably made by a human translator who is capable of translation from the source language to the target language. The training data can include translations for only those segments that are classified by a human translator as translatable into the target language. The training data can also include classifications of certain segments as non-translatable or nearly-translatable into the target language, preferably also made by a human translator.

FIG. 3 illustrates examples segments in a source language that have been classified by human-translators as non-translatable or nearly-translatable into a target language. The source language is English, and the target language is German. Some non-translatable segments 302 include only numbers, such as section numbers, entity names, such as product names or company names, file names, compound words, such as those written in the Camel case notation, or keywords from software documentation. In addition, some nearly-translatable segments 304 include dates, decimal numbers (often followed by units, such as "mm"), or short segments with little or no textual information.

In some embodiments, the server 102 is configured to match the segments with the translations made by a human translator using any known pattern-matching method, obtain match scores, and automatically classify the segments as non-translatable, nearly-translatable, or generally-translatable based on the match scores. For example, the server 102 can set a higher threshold as the minimum score for a non-translatable segment and a lower threshold as the minimum for a nearly-translatable segment.

In some embodiments, the server 102 is programmed or configured to handle the translation for each ordered pair of human-understandable languages separately. Therefore, for each pair of source language and target language, the server 102 is programmed or configured to create a first training dataset comprising segments in the source language, each classified by a human translator as non-translatable, nearly-translatable, or generally-translatable into the target language. The server 102 is also programmed to create a second training dataset comprising segments in the source language, each classified as nearly-translatable by a human translator into the target language, and translations of the segments in the target language provided by the human translator. Alternatively, the second training set can include additional segments in the source language that have been classified as non-translatable or generally translatable, and translations of the additional segments in the target language provided by the human translator.

Building A First Statistical Model for Segment Classification from Training Data In some embodiments, the server 102 is programmed to create a first method or technique for classifying a segment in a source language as non-translatable, nearly-translatable, or generally-translatable into the target language. The first method can be implemented as stored program instructions plus stored term values and operators as needed. The first method can initially comprise a first statistical model that classifies a segment as non-translatable or translatable into the target language, as the distinction between these two classes might be clearer than the distinction between nearly-translatable and generally-translatable into the target language. The first statistical model can be a neural network, a regression model, a decision tree, or another statistical machine learning tool known to someone of ordinary skill in the art. The first method can additionally comprise a technique or heuristic that further classifies translatable segments as nearly translatable or generally-translatable into the target language. Alternatively, the first statistical model can directly classify a segment as non-translatable, nearly-translatable, or generally-translatable.

In some embodiments, the server 102 is programmed or configured to create a neural network as the first statistical model. The neural network can be a character-level convolutional neural network ("CNN"), which treats characters as basic units and considers relationships among different characters. CNNs are well-known in the field. See Kim. "Convolutional Neural Networks for Sentence Classification." *Proceedings of the 2014 Conferences on Empirical Methods in Natural Language Processing (EMNLP)*, pages 1746-1751 (2014) and Kim et al. "Character-Aware Neural Language Models." Proceedings of the Thirtieth AAAI Conference on Artificial Intelligence, pages 2741-2749 for example applications of CNNs to language classification. Any existing neural network implementation, such as the TensorFlow library (version 1.2), can be used to implement CNN-related operations. The neural network can also be a word-level CNN, which operates at a higher granularity than a character-level CNN by treating words as basic units and typically requires an additional tokenization procedure. A character-level CNN appears advantageous in this case because non-translatable and nearly-translatable segments tend to be short, constituting metadata, including punctuation or other special characters, or not forming word sequences.

Figure 4:
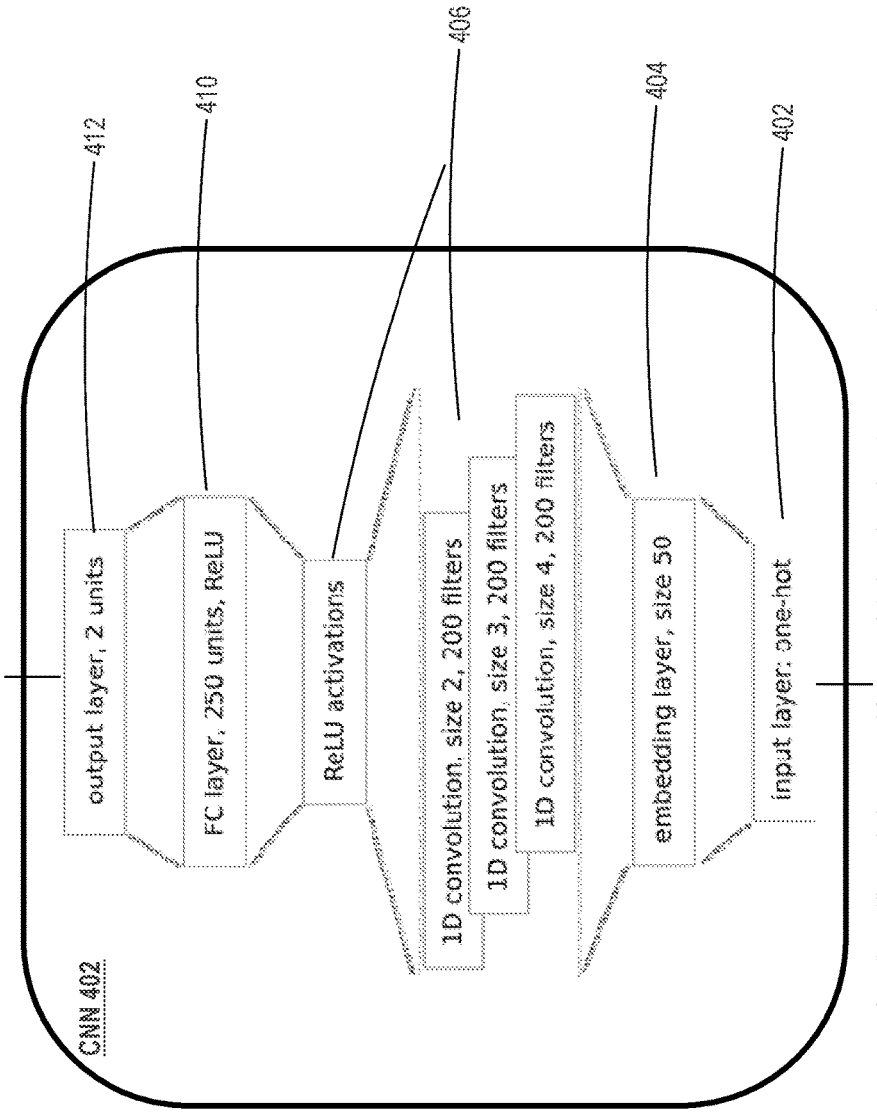
FIG. 4 illustrates an example architecture of a character-level convolutional neural network for classifying a segment in a source language as non-translatable or translatable into a target language.

FIG. 4 illustrates an example architecture of a character-level CNN for classifying a segment in a source language as non-translatable or translatable into a target language. In some embodiments, the server 102 is programmed or configured to create a character-level CNN comprising an input layer 402, an embedding layer 404, a plurality of convolutional layers with rectified linear units ("ReLUs") 406, a fully-connected layer with a ReLUs 410, and an output layer 412. The server 102 can also be configured to select an architecture for the character-level CNN comprising the same or different types of layers connected in various arrangements. For example, the character-level CNN can include an additional normalization layer or loss layer.

In some embodiments, the input layer 402 can take an input matrix representing each input segment having a series of characters over a language-specific alphabet. The alphabet can include letters, numbers, control characters, punctuations, and so on. For example, the input matrix can have multiple rows each representing a character as a one-hot vector. The embedding layer 404 can set the dimensionality of character embeddings to 50 and convert each one-hot vector into a 50-dimensional vector. The convolutional layers with ReLUs 406 can be associated with one-dimensional filters corresponding to short series of characters, such as bigrams, trigrams, or four-grams. The convolutional layers with ReLUs 406 can apply zero-padding to the input matrix and each feature map or apply a stride during convolution. Each of the convolutional layers can perform convolution followed by a rectified linear operation and optionally followed by max-pooling. Max-pooling over time is done from the whole sentence, i.e., for each filter (kernel), there is a single value extracted from the whole sentence. For example, the convolutional layers with ReLUs 406 can be associated with 200 filters corresponding bigrams, 200 filters corresponding to trigrams, and 200 filters corresponding to four-grams, each applied with no zero-padding and coupled with a ReLU and a max-pooling unit. The fully-connected layer with a ReLU 410 can have Softmax as the ReLU. For example, the fully-connected layer can have 250 neurons with Softmax units sending a distribution over the two classes of non-translatable into the target language and translatable into the target language to the output layer 412. The distribution into the non-translatable class can then be considered as the classification score of the input segment, in which case the classification score would be inversely related to the translatability into the target language. The output layer 412 can automatically produce a classification for the input segment, such as the class with the highest distribution or distributed probability.

In some embodiments, with a selected architecture for the character-level CNN, such as the one illustrated in FIG. 4, the server 102 is programmed or configured to train the character-level CNN to generate values for various parameters of the different layers, including the embedding layer and the convolutional layers, over the training datasets. While the same architecture can apply to one or more pairs of languages, the training can be performed for each pair of source and target languages. Therefore, for each pair of source and target languages, the training can be performed over the first training dataset, as discussed above, using gradients derived with chain rule and computed with backpropagation or other training methods known to someone of ordinary skill in the art. The nearly-translatable and generally-translatable classifications can be merged for a two-way classification into non-translatable and translatable. The training can be performed in batches by selecting a specific number of segments as the batch size, and randomly shuffling the first training dataset between epochs. For example, each batch can consist the first 500 segments of a newly shuffled first training dataset. Furthermore, the accuracy of the current character-level CNN can be validated or improved using a held-out set, which can be randomly selected from the first training dataset. Early stopping with a fixed patience can be used to detect and prevent overfitting of the character-level CNN.

Evaluating the First Statistical Model

Figure 5:
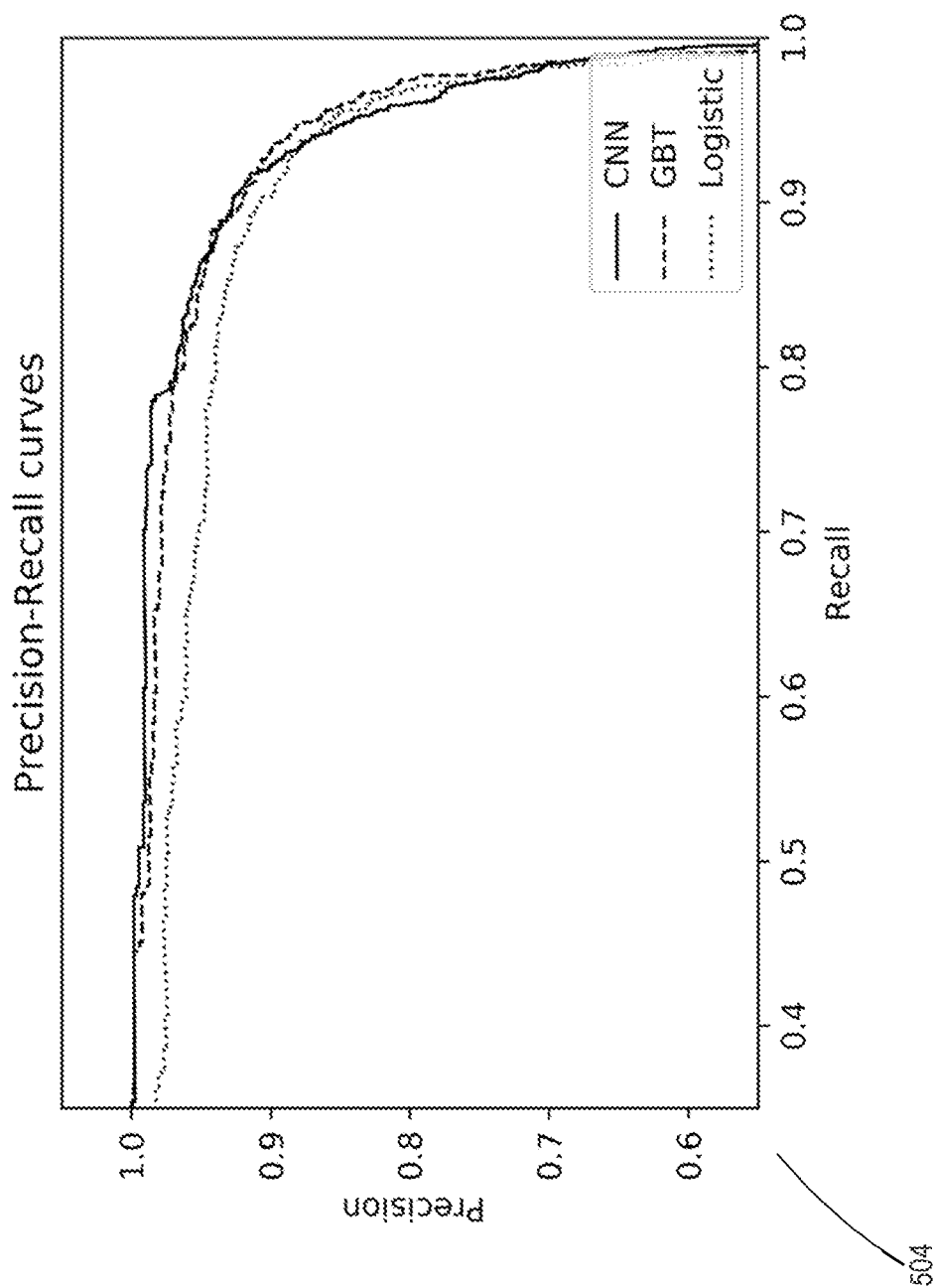
FIG. 5 illustrates an example performance comparison among different statistical models for identifying segments in a source language that are non-translatable into a target language.

FIG. 5 illustrates an example performance comparison among different statistical models for identifying segments in a source language that are non-translatable into a target language. The different statistical models under consideration are a character-level CNN, gradient boosted trees (GBT), and a logistic regression model. The source language is English, and the target language is German. The chart 504 shows the recall and precision of these three methods corresponding to different classification criteria on the x- and y-axes, respectively. The CNN was trained with a training dataset of 65,000 segments, approximately 25% of which have been classified as non-translatable, and a held-out set of 5,000 segments, approximately 25% of which have been classified as non-translatable. The training, held-out and test sets for the alternative methods were identical. Specifically, both logistic regression and GBT use an identical set of features extracted from the training dataset. Tokenization is required for both models. The feature set comprises indicator features for words (10,000 most frequent words), pairs of consecutive words (bigrams, 2,000 most frequent), and character-level features: bigrams, trigrams and four-grams (most frequent 1,000, 5,000, and 5,000, respectively). The logistic regression model was trained using the LIBLINEAR package (version 2.11) with standard settings. The L2 regularization weight was set to 1.0. The GBT model was built using the xgboost library (version 0.6). Training was done in 1,000 boosting rounds with early stopping enabled (patience=50), and the maximum tree depth was set to 10. In this comparison, the CNN classified the English segments as non-translatable or translatable into German with a very high precision for relatively high recall. Specifically, using 0.942 as the minimum classification score for classifying a segment as non-translatable, the F1-score for the CNN is 0.85, with the precision equal to 0.986 and the recall equal to 0.748. At any given level of recall above approximately 0.75, the CNN gave the best performance with a precision still close to one.

In some embodiments, while the character-level CNN, for example, would automatically produce a classification as non-translatable or translatable, as discussed above, the server 102 can be programmed or configured to adjust such classification based on a first predetermined threshold on the classification score. The first threshold can be determined with respect to a held-out set to maximize recall while maintaining a pre-defined level of precision, and serve as a minimum for a classification score associated with a classification as non-translatable. For example, the segments classified as non-translatable by the first statistical model may include all the segments that have classification scores 0.5 or above and an average classification score of 0.8. However, the server 102 can be configured to adjust the classifications by setting a threshold of 0.9 as the minimum classification score of any segment to be classified as non-translatable to increase the precision.

Developing a Technique for Further Segment Classification

As discussed above, the server 102 is programmed or configured to create a first method or technique for classifying a segment in a source language as non-translatable, nearly-translatable, or generally-translatable into a target language. In addition to initially comprising a first statistical model that classifies a segment as non-translatable or translatable into the target language, the first method can comprise a technique or heuristic that further classifies the translatable segments as nearly-translatable or generally-translatable into the target language. The technique can be another machine learning tool based on a training dataset containing segments that have been classified as nearly-translatable or generally-translatable by human translators. The technique can also be a thresholding heuristic on classification scores produced by the first statistical model. For example, a second threshold of 0.5 can be set as the minimum classification score of a segment to be classified as nearly-translatable, as such a segment has been deemed more likely to be non-translatable than translatable by the first statistical model and thus is still quite likely to be merely nearly-translatable. By setting a relatively stringent first threshold on the classification scores for identifying non-translatable segments and a relative loose second threshold on the classification scores for identifying nearly-translatable segments, the first method can achieve a high precision in identifying the non-translatable segments while providing automatic translations for a significant portion of the nearly-translatable segments.

Translation of Nearly-Translatable Segments

Preparing Training Data

In some embodiments, as discussed above, the server 102 is programmed to create a second training dataset comprising segments in the source language, each classified as nearly-translatable by a human translator into the target language, and translations of the segments in the target language provided by the human translator.

Building a Second Statistical Model for Segment Translation

In some embodiments, the server 102 is programmed to create a second method or technique for generating a translation for a segment in a source language that is nearly-translatable into a target language. The second method can be implemented as stored program instructions plus stored term values and operators as needed. The second method can comprise a second statistical model, such as a neural network, a regression model, a decision tree, or another statistical machine learning tool known to someone of ordinary skill in the art. The server 102 can be further programmed or configured to create a neural network as the second statistical model. The neural network can be a character-level encoder-decoder recurrent neural network (RNN) with an attention mechanism. RNNs are well-known in the field. See Bandanau et al. "Neural Machine Translation by Jointly Learning to Align and Translate." *arXiv preprint arXiv:* 1409.0473 (2014) and Bluche et al. "Where to Apply Dropout in Recurrent Neural Networks for Handwriting Recognition". *Proceedings of the 13th International Conference on Document Analysis and Recognition (ICDAR)*, pages 681-685 (2015). IEEE for example applications of RNNs to language generation. Any existing neural network implementation, such as TensorFlow library (version 1.2), can be used to implement RNN-related operations. A word-level RNN can also be used. A character-level RNN appears advantageous in this case for similar reasons discussed above in connection with CNNs. In addition, the RNNs are suitable in this case because many of the segments classified as nearly-translatable are relatively short, which mitigates the problem of gradients vanishing over long sequences that often affects recurrent networks.

In some embodiments, the server 102 is programmed or configured to create a character-level encoder-decoder RNN with an attention mechanism comprising an input layer, an embedding layer, a recurrent encoder layer with dropout, a recurrent decoder layer with attention and dropout, and an output layer. The server 102 can also be configured to select an architecture for the character-level encoder-decoder RNN comprising the same or different types of layers connected in various arrangements. For example, the recurrent encoder layer can be replaced by a convolutional encoder layer to shorten input segments into the recurrent decoder layer. Drop-out is applied on the outputs of recurrent layers during training. The output value is automatically scaled to keep the expected output value constant. Different drop-out pattern is applied at each time step. The embedding layer can set the dimensionality of character embeddings to 50. The recurrent encoder layer and the recurrent decoder layer can each have 500 gated hidden units or gated recurrent units (GRUs). The recurrent encoder layer can be bi-directional. Dropout can be applied for a probability of 0.3 on the outputs of all recurrent layers. The output value is automatically scaled to keep the expected output value constant. A different drop-out pattern can be applied at each time step. The recurrent decoder layer can use a beam search with a width of 5 to find a translation that approximately maximizes the conditional probability given the model.

In some embodiments, with a selected architecture for the character-level encoder-decoder RNN, the server 102 is programmed or configured to train the character-level encoder-decoder RNN to generate values for various parameters of the different layers over training datasets. While the same architecture can apply to one or more pairs of languages, the training can be performed for each pair of source and target languages. Therefore, for each pair of source and target language, the training can be performed over the second training dataset, as discussed above, by optimizing the cross-entropy of the whole segment. To prevent exploding gradient, simple gradient clipping can be applied with a minimum value of −1 and a maximum value of +1. The server 102 can also be configured to use scheduled training to counter exposure bias or optimize expected BLEU, or apply learning rate annealing schedules.

Executing the Statistical Models and Techniques for Segment Classification and Translation In some embodiments, the server 102 is programmed or configured to receive from a user computer 122 over a communication network 118 an input document in a source language for translation into a target language. Initially, the server 102 can be configured to break the input document into a list of segments. Each segment could correspond to a word, a sentence, or a line, or it can be specifically recognized using a statistical model known to someone of ordinary skill in the art.

In some embodiments, the server 102 is programmed or configured to feed each of the list of segments into the first method to classify the segment into non-translatable, nearly-translatable, or generally-translatable into the target language. As discussed above, the first method can include the first statistical model, such as a character-level CNN, that generates a classification score indicating a translatability into the target language for a segment, and a set of criteria that converts the classification score into one of three classes of non-translatable, nearly-translatable, and generally-translatable into the target language, such as a first threshold that serves as the minimum classification score for a segment to be classified as non-translatable and a second threshold that serves as the minimum classification score for a segment to be classified as nearly-translatable. The method can alternatively include a first statistical model that classifies a segment as non-translatable and translatable into the target language and a thresholding heuristic that identifies nearly-translatable segments from the set of translatable segments.

In some embodiments, for each segment that has been classified as nearly-translatable using the first method, the server 102 is programmed or configured to apply the second method to generate a translation for the segment. As discussed above, the second method can include the second statistical model, such as a character-level encoder-decoder recurrent RNN with attention.

Presentation of Automatic Translations

In some embodiments, the server 102 is programmed or configured with data structures and/or database records that are arranged to transmit to the user computer 122 the classifications for the segments in the input document and the translations for those segments classified as nearly-translatable. The translations for those segments classified as non-translatable, which would be identical to the segments, could also be transmitted to the user computer 122. The classification score for the segments can also be transmitted to the user computer 122. The server 102 can be programmed to transmit a classification, translation, or score for a segment as soon as the data becomes available, deliver the data for all the segments in the input document at once, or according to some predetermined schedule.

In some embodiments, the server 102 is programmed or configured to cause the user computer 122 to display translations for those segments classified as non-translatable or nearly-translatable. FIG. 6 illustrates an example graphical user interface for interacting with a user in a translation process. The input document is in Czech, and the user computer 122 has received from the server 102 a list of segments 602 in the input document and their classification scores 604, classifications 606, and translations into English 608. While the classification for each segment can be inferred from the translation, the additional display of the classification can provide increased clarity. The display of the classification score can further provide increased clarity to a user and assist in the user's decision on whether to adjust the translations provided by the server 102. For example, the classification score for a segment that is borderline between nearly-translatable and generally-translatable may be close to the threshold that separates the two classes, and that might alert a user to a possible need to edit the automatic translation provided by the server 102 for the segment that has been classified as nearly-translatable. The user computer 122 can display the translations in different manners based on the sources (e.g., human or server 102) or types of the translations (e.g., no translation, slight translation, or general translation). In general, the graphical user interface can display more or fewer columns, display the columns in different orders, or display different rows or columns in different manners, or display the same information in a non-table format. Furthermore, a user can be allowed to edit part or all of the translations provided by the server 102. A user can also provide a translation for those segments that have been classified as generally-translatable automatically or in response to a prompt from the user computer 122. The user computer 122 can transmit the inputs or edits to the server 102 as soon as they become available, at the end of a translation session, or according to a predetermined schedule.

In some embodiments, the server 102 is programmed or configured to receive translations provided by a human translator from the user computer 122 and save them in a database. The server 102 can be programmed to update the training datasets with new human translations and the methods, models, or techniques used to classify segments and generate translations. These updates for a specific pair of source and target languages can be performed depending on the amount of new data, the frequency of requests for translations, or a predetermined schedule. Furthermore, the server 102 can be programmed to track the input or edit histories and update the methods, models, or techniques accordingly. For example, when significant updates are made to the automatic translations provided for those segments classified as nearly-translatable, the threshold that serves as the minimum for a segment to be classified as nearly-translatable can be raised so that more segments would be classified as generally-translatable. On the other hand, when updates are made to the automatic translations provided for those segments classified as nearly-translatable to revert any changes from the original segments, the threshold that serves as the minimum for a segment to be classified as non-translatable can be lowered so that more segments would be classified as non-translatable. In addition, when the translations provided by a human translator differ only slightly from the original segments, which can be determined by a pattern matching algorithm known to someone of ordinary skill in the art, the criterion used to distinguish nearly-translatable segments from generally-translatable segments can be adjusted.

Example Processes

Figure 7:
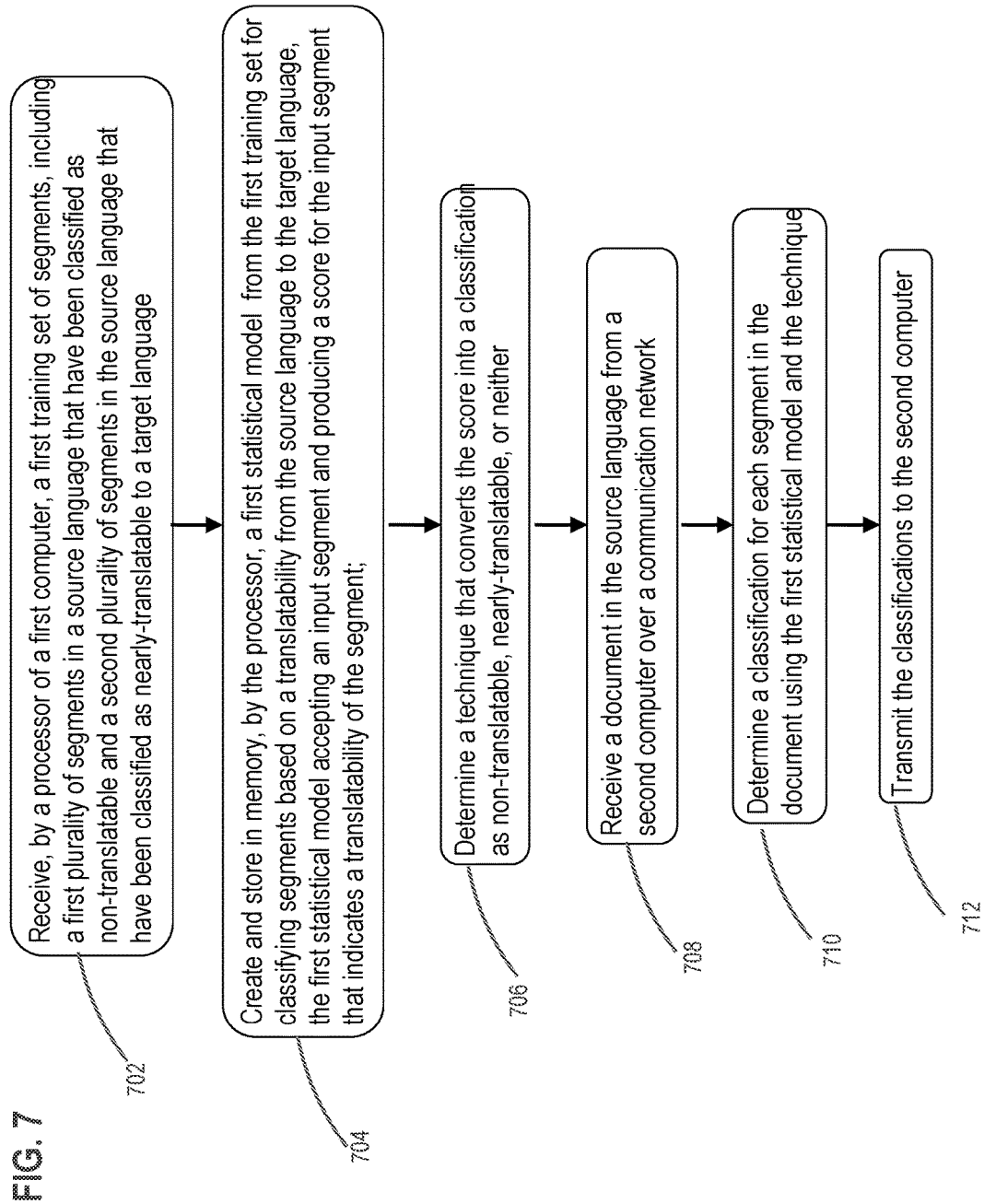
FIG. 7 illustrates an example process of developing and applying techniques for classifying segments in a source language as non-translatable, nearly-translatable, or generally-translatable into a target language and for providing translations for those segments classified as nearly-translatable.

FIG. 7 is intended to disclose an algorithm, plan or outline that can be used to implement one or more computer programs or other software elements which when executed cause performing the functional improvements and technical advances that are described herein. Furthermore, the flow diagram herein is described at the same level of detail that persons of ordinary skill in the art ordinarily use to communicate with one another about algorithms, plans, or specifications forming a basis of software programs that they plan to code or implement using their accumulated skill and knowledge.

FIG. 7 illustrates an example process of developing and applying techniques for classifying segments in a source language as non-translatable, nearly-translatable, or generally-translatable into a target language and for providing translations for those segments classified as nearly-translatable. In some embodiments, in step 702, the server 102 (first computer) is programmed to receive a first training dataset of segments in a source language, together with human classifications for these segments. The first training dataset can be received from a user computer 122, a data source, or another system. The first training dataset can include a first plurality of segments that have been classified as non-translatable and a second plurality of segments that have been classified as nearly-translatable into a target language.

In step 704, the server 102 is programmed to create and store in memory a first statistical model from the first training set for classifying segments in the source language based on a translatability into the target language. The first statistical model can accept an input segment in the source language and produce a score for the input segment that indicates the translatability of the segment into the target language, such as a score that is inversely related to the translatability. The first statistical model can be a character-level CNN that produces a distribution of probabilities into at least the class of non-translatable and translatable into the target language. The probability distributed into the non-translatable class can be considered as the classification score of the segment.

In step 706, the server 102 is programmed to determine a technique that converts the score into a classification into non-translatable, nearly-translatable, or neither. The technique can include assigning the segment to the class with the highest distributed probability. When the probably distribution is over two classes, the class that receives a distributed probability of 0.5 or higher would be the assigned class. Alternatively, the technique can include setting a first threshold on the classification scores for classifying a segment as non-translatable and a second threshold on the classification scores for classifying a segment as nearly-translatable. The first threshold can be relatively stringent to reduce the number of non-translations and the second threshold can be relatively loose to increase the number of automatic translations.

Additionally, the server 102 can be configured to receive a second training dataset including a third plurality of segments in the source language that have been classified as nearly-translatable and a fourth plurality of segments that have been identified as translations in the target language for the third plurality of segments. The server 102 can be further configured to create and save a second statistical model for generating for a nearly-translatable segment in the source language a translation in the target language using the second training dataset.

In step 708, the server 102 is programmed to receive a document in the source language for translation into the target language from a user computer 122 (second computer) over a communication network 118. In step 710, the server 102 is configured to obtain a set of segments from the document and determine a classification as non-translatable, nearly-translatable, or generally-translatable into the target language for each of the set of segments using the first statistical model and the technique. The segments can correspond to words, sentences, or lines, or generated from certain segmentation methods. The server 102 can also be programmed to obtain a translation for each segment classified as nearly-translatable using the second statistical model.

In step 712, the server 102 is configured to transmit the classifications for the segments in the document to the user computer 122. The server 102 can also be configured to transmit the translation for the segments that have been classified as nearly-translatable. The transmission can occur as soon as the classification or translation for a segment becomes available, when the entire document is processed, or according to some predetermined schedule.

Additionally, the server 102 is configured to cause the user computer 122 to display the classifications and translations. For a segment classified as non-translatable, the user computer 122 can display the segment as its own translation. For a segment classified nearly-translatable, the user computer 122 can display the translation generated by the server 102 as the translation. For any other segment in the document, the user computer 122 can receive a translation from a human translator. The user computer 122 can also receive edits to the automatic translations for the segments classified as non-translatable or nearly-translatable from a human translator. In addition, the user computer 122 can send all the inputs or edits back to the server 102. The server 102 in response can use the inputs or edits update the statistical models or techniques.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
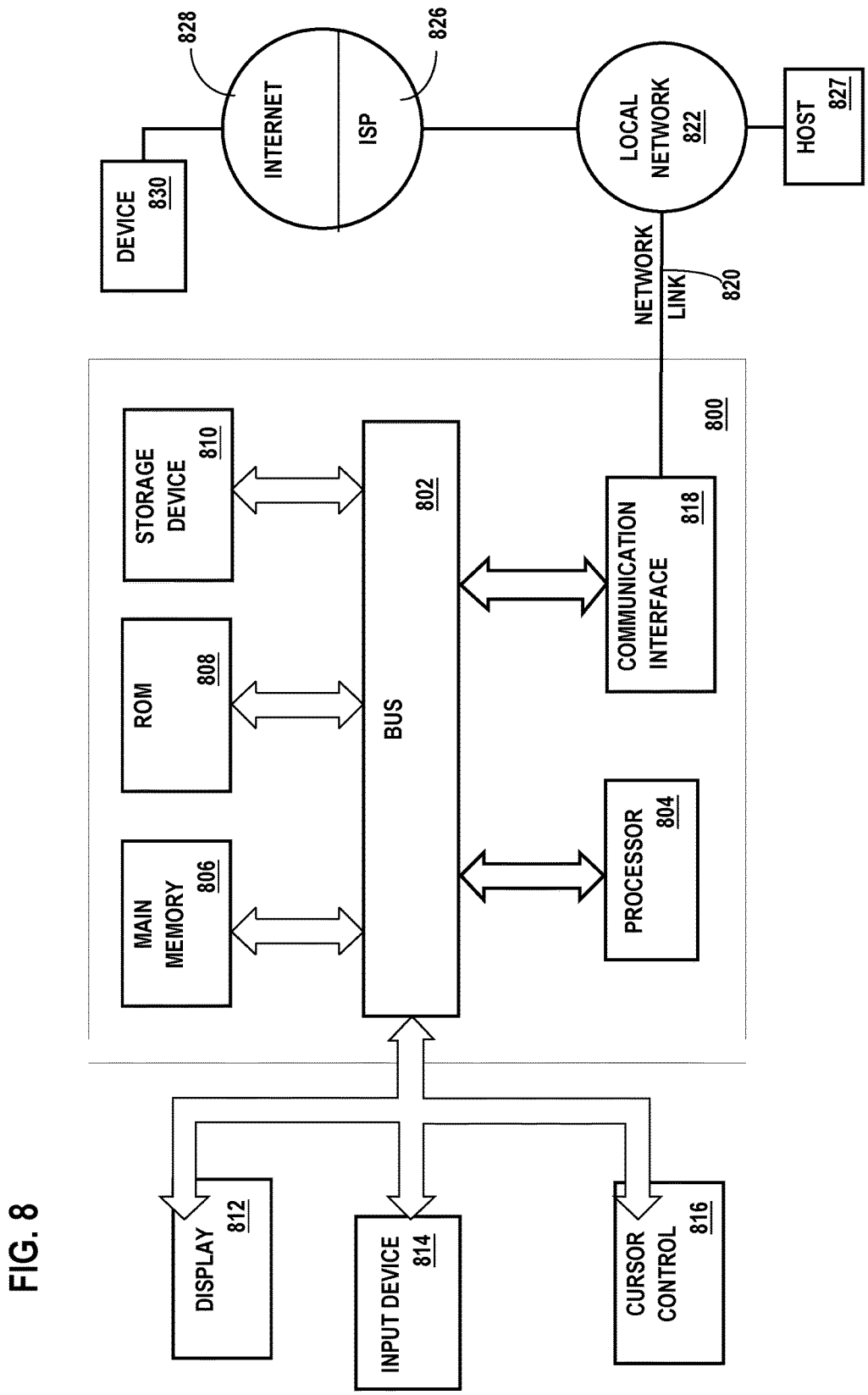
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 827 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a device 830 might transmit a requested code for an application program through Internet 828, ISP 826, local network 822 and communication interface 818.

The received code may be executed by processor 804 as it is received, and/or stored in storage device 810, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method of automatically classifying written segments and translating written segments between human-understandable languages, comprising:
receiving, by a processor of a first computer, a first training set of segments, including a first plurality of segments in a source language that have been classified as non-translatable to a target language and a held-out set;
creating and storing in memory, by the processor, a first statistical model from the first training set for classifying segments based on a translatability from the source language to the target language,
the first statistical model accepting an input segment and producing a score for the input segment that indicates a translatability of the segment;
determining a set of criteria that converts the score into a classification as non-translatable to a target language or translatable to the target language,
the set of criteria including a first threshold on scores produced by the first statistical model for classifying segments as non-translatable from the source language to the target language,
the first threshold maximizing recall while maintaining a certain level of precision with respect to the held-out set;
receiving a document comprising a list of segments in the source language from a second computer over a communication network;
determining a score and a classification for each of the list of segments using the first statistical model and the set of criteria;
in response to the classification of one of the list of segments as non-translatable into the target language, causing the second computer to display the one segment as the translation in the target language.

2. The computer-implemented method of claim 1, further comprising extracting the list of segments from the document.

3. The computer-implemented method of claim 1,
the first statistical model producing a probability distribution into two or more classes, including non-translatable into the target language,
the score being the probability distributed into the class of non-translatable into the target language.

4. The computer-implemented method of claim 1, the first statistical model being a character-level convolutional neural network.

5. The computer-implemented method of claim 4, the convolutional neural network including one-dimensional filters for bigrams, trigrams, or four-grams.

6. The computer-implemented method of claim 4, the convolutional neural network including an input layer, an embedding layer, one or more convolutional layers, a fully-connected layer, and an output layer.

7. The computer-implemented method of claim 6, each of the one or more convolutional layers and the output layer including a rectifier linear unit.

8. The computer-implemented method of claim 4, the building comprising:
randomly shuffling the first training set to obtain multiple batches;
monitoring accuracy of the first statistical model being built for each of the multiple batches with respect to predetermined held-out set;
applying early stopping with a predetermined patience based on the monitoring.

9. The computer-implemented method of claim 1, the first plurality of segments including numbers, entity names, file names, compound words, or keywords from software documentation.

10. The computer-implemented method of claim 1, further comprising transmitting the set of scores or classifications for the list of segments in the source language to the second computer.

11. A non-transitory machine-readable medium having instructions stored thereon, the instructions executable by the one or more processors to perform:
receiving, by a processor of a first computer, a first training set of segments, including a first plurality of segments in a source language that have been classified as non-translatable to a target language and a held-out set;
creating and storing in memory, by the processor, a first statistical model from the first training set for classifying segments based on a translatability from the source language to the target language,
the first statistical model accepting an input segment and producing a score for the input segment that indicates a translatability of the segment;
determining a set of criteria that converts the score into a classification as non-translatable to a target language or translatable to the target language,
the set of criteria including a first threshold on scores produced by the first statistical model for classifying segments as non-translatable from the source language to the target language,
the first threshold maximizing recall while maintaining a certain level of precision with respect to the held-out set;
receiving a document comprising a list of segments in the source language from a second computer over a communication network;
determining a score and a classification for each of the list of segments using the first statistical model and the set of criteria;
in response to the classification of one of the list of segments as non-translatable into the target language, causing the second computer to display the one segment as the translation in the target language.

12. A system for automatically classifying written segments and translating written segments between human-understandable languages, comprising:
one or more processors;
a non-transitory machine-readable medium having instructions stored thereon, the instructions executable by the one or more processors to perform:
receiving a first training set of segments, including a first plurality of segments in a source language that have been classified as non-translatable to a target language and held-out set;
creating and storing in memory a first statistical model from the first training set for classifying segments based on a translatability from the source language to the target language,
the first statistical model accepting an input segment and producing a score for the input segment that indicates a translatability of the segment;

determining a set of criteria that converts the score into a classification as non-translatable to the target language or translatable to the target language, the set of criteria including a first threshold on scores produced by the first statistical model for classifying segments as non-translatable from the source language to the target language, the first threshold maximizing recall while maintaining a certain level of precision with respect to the held-out set;

receiving a document comprising a list of segments in the source language from a remote computer over a communication network;

determining a score and a classification for each of the list of segments using the first statistical model and the set of criteria;

in response to the classification of one of the list of segments as non-translatable into the target language, causing the second computer to display the one segment as the translation in the target language.

* * * * *